United States Patent Office 3,033,750
Patented May 8, 1962

3,033,750
PROCESS FOR PREPARING N-DESULFOHEPARIN
Léon Velluz, Paris, Gérard Nominé, Noisy-le-Sec, and Lucien Penasse, Paris, France, assignors to Roussel-UCLAF Societe Anonyme, Paris, France
No Drawing. Filed Jan. 13, 1960, Ser. No. 2,100
Claims priority, application France Jan. 29, 1959
4 Claims. (Cl. 167—74)

This invention relates to an improved method of preparing N-desulfoheparin, a heparin derivative in which the sulfamic groups (—$NHSO_3H$) has been transformed to the free amine groups (—$NH_2$).

It is known that heparin can be isolated from the lungs of mammals. Heparin is a compound having a molecular weight of about 25,000 and is characterized from the point of view of physiology by its anticoagulant activity. At the same time heparin also exhibits an antilipemic activity, as shown by the fact that alimentary lipemia in humans (turbidity of the blood caused by ingestion of a meal rich in lipids) is reduced a few minutes after intravenous injection of heparin. It is of therapeutic interest to dissociate these two activities of heparin and to enhance the antilipemic activity with respect of the anticoagulant effects.

In copending application Serial No. 824,676, filed July 2, 1959, and commonly assigned, there is described a process for the production of N-desulfoheparin and N-acylated derivatives thereof. These N-acylated derivatives of N-desulfoheparin are high in antilipemic activity without having a high anticoagulant activity as compared with heparin. The ratio of their antilipemic activity to anticoagulant activity is 6 or higher as compared with about 1 for heparin. This prior application discloses a process of preparing N-desulfo-heparin, hereinafter sometimes called heparamine, by subjecting heparinic acid to a reaction with a lower alcohol to give desulfonated ester which after alkaline cleavage results in heparamine. This heparamine has been found to be practically free from anticoagulant activity but possesses only a weak antilipemic activity. The N-acylated derivatives of this heparamine, however, exhibit the desired property, in that their antilipemic activity is enhanced with respect to their anticoagulant activity and, in certain cases, the antilipemic activity is almost identical to that of heparin while the anticoagulant activity is largely suppressed.

The preferred N-acylated heparamine derivatives are those where the acyl radical is derived from carboxylic and sulfonic acids of the aliphatic, alicyclic, araliphatic, heterocyclic aromatic or carboxylic aromatic series, and for best results the acyl radical should contain a carbocyclic aromatic nucleus such as the benzene nucleus or the naphthalene nucleus. The carbocyclic aromatic nucleus may be substituted with other radicals such as etherified or esterified hydroxyl groups, alkyl groups, halogen atoms or nitro groups. These acyl radicals are derived from such carboxylic acids as benzoic acid, β-naphthoic acid, 3,5-dimethyl-benzoic acid, 3,4,5-trimethoxy-benzoic acid, p-acetoxy-benzoic acid, p-nitro-benzoic acid and 2,4-dinitro-benzoic acid. Additional carboxylic acids which have been or may be utilized in the acylating step are phenyl-acetic acid, 2-phenyl-butanoic acid, 2,4-dichloro-phenoxy-acetic acid, carboxylic acids of furan, such as furan-2-carboxylic acid, the lower fatty acids, such as acetic acid or isocaproic acid. In addition sulfonic acids, and particularly p-toluene-sulfonic acid can be utilized as the acyl derivative.

In this prior application heparin is subjected to alcoholysis in the form of the free acid, which caused a partial esterification of the carboxyl groups and made a subsequent alkaline treatment necessary to saponify the esters.

The present invention has as its objects an improvement in the first stage in the preparation of the N-acylated derivatives of heparamine.

A further object of this invention is the development of a simplified process for the preparation of heparamine which makes it possible to avoid the additional saponification step.

These and other objects of the invention will become more apparent as the description proceeds.

We have discovered that excellent yields of heparamine can be obtained by subjecting a high-molecular weight quaternary ammonium salt of heparin to an alcoholysis reaction with a tertiary alcohol having a low rate of esterification in the presence of a strong acid. The heparamine is isolated in the form of its sodium salt by extracting with an aqueous solution and precipitating with methanol or ethanol. The sodium salt of heparamine is purified by reprecipitating from aqueous solution in the form of a salt with a high-molecular weight quaternary ammonium compound capable of producing a water-insoluble salt by double decomposition.

The high-molecular weight quaternary ammonium salt of heparin used as a starting material can be prepared by known methods such as by subjecting an alkali metal heparinate dissolved in an aqueous solution to a double decomposition reaction with a solution of a high-molecular weight quaternary ammonium compound capable of producing a water-insoluble salt by double decomposition.

In the execution of the process according to the invention, we use high-molecular weight quaternary ammonium salts capable of producing water-insoluble salts with heparin by double decomposition such as the preferred benzyldimethyl - 2 - [2-(p-1,1,3,3-tetramethylbutyl-phenoxy)-ethoxy]-ethyl ammonium chloride having the empirical formula $C_{27}H_{42}ClNO_2 \cdot H_2O$ and the structural formula

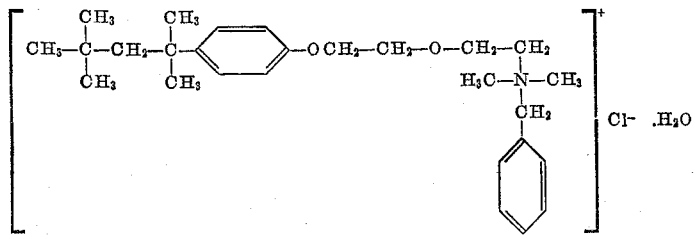

hereinafter referred to by its commercial name "Hyamine 1622." Other high-molecular weight quaternary ammonium salts may be used in place of "Hyamine 1622." Other such high-molecular weight quaternary ammonium salts are "Hyamine 2389" described in the "Index of Modern Sulfonated Oils and Detergents" (vol. II) by J. P. Sisley, page 373, as being the chloride of a quaternary ammonium base, "Cequartyl BE" mentioned on page 287 of the Index as being "based on ammonium salts," "Arquad 2C" which according to the same index on page 261 is said to be dilauryl dimethyl ammonium chloride and "Zephirol" which according to the same Index on page 286 is said to be alkyl dimethyl benzyl ammonium chloride.

The tertiary alcohol used in the alcoholysis can be any tertiary alcohol having a low rate of esterification. We prefer the tertiary lower alkanols such as tertiary butanol. Other tertiary lower alkanols such as tertiary amyl alcohol can also be employed.

For a strong acid we can use any strong acid soluble in an anhydrous reaction medium. Primarily effective are the organic sulfonic acids such as p-toluene sulfonic acid. Other sulfonic acids such as benzene sulfonic acid can also be used.

The alcoholysis reaction is carried out in an anhydrous reaction medium. The tertiary lower alkanol may be used in excess as the reaction medium or other organic solvents such as benzene may be employed in addition to the tertiary lower alkanol. The alcoholysis reaction is conveniently carried out at elevated temperatures, preferably, while refluxing. The raw heparamine precipitates when the reaction mixture is cooled.

The alcoholysis is advantageously carried out in tertiary butanol in the presence of p-toluene-sulfonic acid.

The following example will make the invention better understood without, however, limiting it. Thus, it will be understood that other salts of heparin than those mentioned above may be used, of course provided that they are sufficiently soluble in the reaction mixture, without departing from the scope of the invention.

EXAMPLE

*Preparation of Heparamine Starting From Sodium Heparinate*

(a) HEPARINATE OF "HYAMINE 1622"

10 gm. of sodium heparinate (S=13.2%, solvation=11.6%) are transformed into the "Hyamine 1622" salt by dissolving in water and adding 2.7 gm. of "Hyamine 1622" in dilute aqueous solution per gram of sodium heparinate. The mixture is allowed to stand overnight. The insoluble matter is then separated by centrifuging, washed by trituration three times with 50 cc. aliquots of water and dried.

(b) ALCOHOLYSIS 10 gm. of the heparinate of "Hyamine 1622" obtained above are dissolved in 200 cc. of anhydrous tertiary butanol. 3 gm. of p-toluene-sulfonic acid in solution in 100 cc. of a mixture of equal parts of benzene and anhydrous tertiary butanol are added. The addition is effected over a period of 15 minutes while the solution of the salt of heparin is refluxed. The reaction mixture is maintained at the boiling point for an additional 15 minutes and is then cooled. Heparamine precipitates and, after standing overnight, the mixture is filtered. The filter cake is washed with tertiary butanol and redissolved by agitation in a mixture consisting of 100 cc. of tertiary butanol, 20 cc. of a 20% aqueous solution of sodium acetate and 10 cc. of a 10% aqueous solution of "Hyamine 1622." After decanting the aqueous phase, the organic phase is extracted three times with 10 cc. of a 20% aqueous solution of sodium acetate. The aqueous phases are combined, the reaction product, the sodium salt of heparamine, is precipitated by adding 5 volumes of methanol and, after vacuum filtration and washing of the filter cake with methanol, the raw sodium salt of heparamine is obtained. This salt is purified by precipitation in the form of the "Hyamine 1622" salt. The salt is taken up or suspended in tertiary butanol and transferring into an aqueous phase containing "Hyamine 1622" in solution. The "Hyamine 1622" salt of heparamine is precipitated therefrom after having adjusted the pH to 9.5.

Yield: 3.2 gm. of the pure product (which is about 75% of theory).

*Analysis.*—Calculated: Free amine by potentiometry (as N) 2.6%. Found 2.65%. Calculated: Sulfur 10.43%. Found: 10.1%.

The reaction of esters with hydroxylamine is negative.

This heparamine salt can be acylated according to the procedures of copending application Ser. No. 824,676.

It will be understood that the invention is not limited to the particular method above described which is given only for purposes of illustration. More particularly, the nature of the solvents, the high-molecular weight quaternary ammonium compound or the reaction temperature may be varied without departing from the scope of the invention. While a certain specific embodiment of the invention has been illustrated, it is readily apparent to one skilled in the art that various changes and modifications may be made therein without departing from the spirit of the invention or the scope of the following claims.

We claim:

1. A process for the preparation of N-desulfo-heparin which comprises refluxing a high-molecular weight quaternary ammonium salt of heparin with a tertiary alcohol having a low rate of esterification in the presence of a strong acid in an anhydrous medium and recovering N-desulfo-heparin.

2. A process for the preparation of N-desulfo-heparin which comprises refluxing a high-molecular weight quaternary ammonium salt of heparin with a tertiary alcohol having a low rate of esterification in the presence of a strong acid in an anhydrous medium, cooling, separating the precipitate, redissolving in an aqueous solution containing sodium ions, precipitating by addition of a lower alkanol and recovering N-desulfo-heparin in the form of its sodium salt.

3. A process for the preparation of N-desulfo-heparin which comprises refluxing benzyl dimethyl-2-[2-(p-1,3,3 - tetramethylbutyl-phenoxy)-ethoxy]-ethyl ammonium heparinate with a tertiary lower alkanol in the presence of an organic sulfonic acid in an anhydrous medium and recovering N-desulfo-heparin.

4. The process of claim 3 wherein the alcoholysis of the heparinate is carried out under reflux in tertiary butanol in the presence of p-toluene-sulfonic acid.

References Cited in the file of this patent

Kantor: J.A.C.S., January 1957, pp. 152–3.
Jeanloz: Federation Proceedings, December 1958, pp. 1082–6.